(12) United States Patent
Francescatti et al.

(10) Patent No.: US 12,514,455 B2
(45) Date of Patent: Jan. 6, 2026

(54) INFRARED SIGNAL CAPTURE AND ANALYSIS

(71) Applicant: AngioLytics LLC, Cheyenne, WY (US)

(72) Inventors: Darius S. Francescatti, Cheyenne, WY (US); Cristian J. Wedekind, Cheyenne, WY (US); Scott Tremberth, Cheyenne, WY (US); Philip Paul Hoekstra, III, Cheyenne, WY (US)

(73) Assignee: ANGIOLYTICS LLC, Cheyenne, WY (US)

( * ) Notice: Subject to any disclaimer, the term of this patent is extended or adjusted under 35 U.S.C. 154(b) by 348 days.

(21) Appl. No.: 18/061,198

(22) Filed: Dec. 2, 2022

(65) Prior Publication Data
US 2023/0175957 A1 Jun. 8, 2023

Related U.S. Application Data

(60) Provisional application No. 63/286,344, filed on Dec. 6, 2021.

(51) Int. Cl.
*G01N 21/35* (2014.01)
*A61B 5/01* (2006.01)
(Continued)

(52) U.S. Cl.
CPC ...... *A61B 5/015* (2013.01); *G01N 2021/0106* (2013.01); *G01N 2021/0181* (2013.01); *G01N 2021/0187* (2013.01)

(58) Field of Classification Search
CPC ..... A61B 5/015; A61B 5/0077; A61B 5/4312; G01N 2021/0106; G01N 2021/0181; G01N 2021/0187
See application file for complete search history.

(56) References Cited

U.S. PATENT DOCUMENTS

| | | |
|---|---|---|
| 4,043,757 A | 8/1977 | Wagstaff |
| 4,170,987 A | 10/1979 | Anselmo et al. |

(Continued)

FOREIGN PATENT DOCUMENTS

| | | |
|---|---|---|
| WO | 2013119932 A1 | 8/2013 |
| WO | 2014160113 A1 | 10/2014 |
| WO | 2015138893 A1 | 9/2015 |

*Primary Examiner* — Kaitlyn E Sebastian
(74) *Attorney, Agent, or Firm* — Stetina Garred Brucker & Newboles

(57) ABSTRACT

A system for infrared analysis of a target surface region of a subject includes a reservoir containing a medium at a predetermined temperature and a conduit defining a channel for transmitting the medium from the reservoir to the target surface region. The conduit may have a first end that is attached to an outlet of the reservoir and a second end that is flexibly conformable to a shape corresponding to a perimeter of the target surface region. The system may further include an infrared camera(s) operable to capture infrared image data of the target surface region and one or more processors operable to produce a representation of the captured infrared image data at a plurality of timings relative to the transmission of the medium from the reservoir to the target surface region. Adjunctive reflective surfaces may ensure that IR signals from target geometric surfaces can be captured for analysis.

20 Claims, 5 Drawing Sheets

(51) Int. Cl.
*G01N 21/01* (2006.01)
*G01N 21/71* (2006.01)

(56) References Cited

U.S. PATENT DOCUMENTS

| | | | |
|---|---|---|---|
| 4,341,222 A | 7/1982 | Gardineer et al. | |
| 4,541,279 A | 9/1985 | Schomberg | |
| 4,570,638 A | 2/1986 | Stoddart et al. | |
| 5,083,073 A | 1/1992 | Kato | |
| RE33,914 E | 5/1992 | Robillard | |
| 5,139,025 A | 8/1992 | Lewis et al. | |
| 5,233,994 A | 8/1993 | Shmulewitz | |
| 5,445,157 A | 8/1995 | Adachi et al. | |
| 5,590,653 A | 1/1997 | Aida et al. | |
| 5,709,206 A | 1/1998 | Teboul | |
| 5,782,767 A | 7/1998 | Pretlow, III | |
| 5,908,383 A | 6/1999 | Brynjestad | |
| 5,984,870 A | 11/1999 | Giger et al. | |
| 5,999,843 A | 12/1999 | Anbar | |
| 6,086,247 A | 7/2000 | Von Hollen | |
| 6,117,080 A | 9/2000 | Schwartz | |
| 6,419,636 B1 * | 7/2002 | Young | A61B 5/6804 600/382 |
| 6,733,448 B2 | 5/2004 | Kelly et al. | |
| 6,757,412 B1 * | 6/2004 | Parsons | G06T 7/0012 600/475 |
| 6,825,838 B2 | 11/2004 | Smith et al. | |
| 7,141,024 B2 | 11/2006 | Gaber | |
| 7,154,397 B2 | 12/2006 | Zerhusen et al. | |
| 8,475,377 B2 | 7/2013 | Angott | |
| 8,914,925 B2 | 12/2014 | Angott | |
| 9,101,262 B2 | 8/2015 | Angott | |
| 9,770,175 B2 | 9/2017 | Angott et al. | |
| 10,045,698 B2 | 8/2018 | Angott et al. | |
| 10,052,085 B2 | 8/2018 | Angott et al. | |
| 10,736,551 B2 | 8/2020 | Rogers | |
| 10,827,930 B2 | 11/2020 | Kakileti et al. | |
| 2003/0073951 A1 * | 4/2003 | Morton | A61B 10/0041 604/73 |
| 2004/0081221 A1 | 4/2004 | Sandvoss | |
| 2004/0092845 A1 | 5/2004 | Gaber | |
| 2004/0097811 A1 | 5/2004 | Smith et al. | |
| 2004/0138559 A1 | 7/2004 | Cheng et al. | |
| 2007/0058845 A1 | 3/2007 | Diakides et al. | |
| 2007/0213617 A1 * | 9/2007 | Berman | A61B 5/0091 600/473 |
| 2008/0077005 A1 | 3/2008 | Piron et al. | |
| 2009/0240150 A1 | 9/2009 | Wang et al. | |
| 2010/0080345 A1 * | 4/2010 | Schilling | G06T 7/74 378/208 |
| 2010/0123078 A1 | 5/2010 | Guinta | |
| 2010/0312136 A1 | 12/2010 | Cozzie | |
| 2011/0077523 A1 | 3/2011 | Angott | |
| 2013/0172753 A1 | 7/2013 | Angott | |
| 2013/0198960 A1 | 8/2013 | Angott | |
| 2014/0276091 A1 * | 9/2014 | Angott | A61B 5/015 600/474 |
| 2014/0336502 A1 * | 11/2014 | Neelakanta | A61B 10/02 600/473 |
| 2015/0257650 A1 | 9/2015 | Angott et al. | |
| 2015/0257651 A1 | 9/2015 | Angott et al. | |
| 2015/0305652 A1 | 10/2015 | Angott | |
| 2018/0303406 A1 * | 10/2018 | McKinney | A61B 5/0082 |
| 2019/0365299 A1 | 12/2019 | Carroll et al. | |
| 2019/0391253 A1 | 12/2019 | Szu | |
| 2020/0138300 A1 | 5/2020 | Fleischer et al. | |
| 2021/0182543 A1 | 6/2021 | Gao et al. | |

* cited by examiner

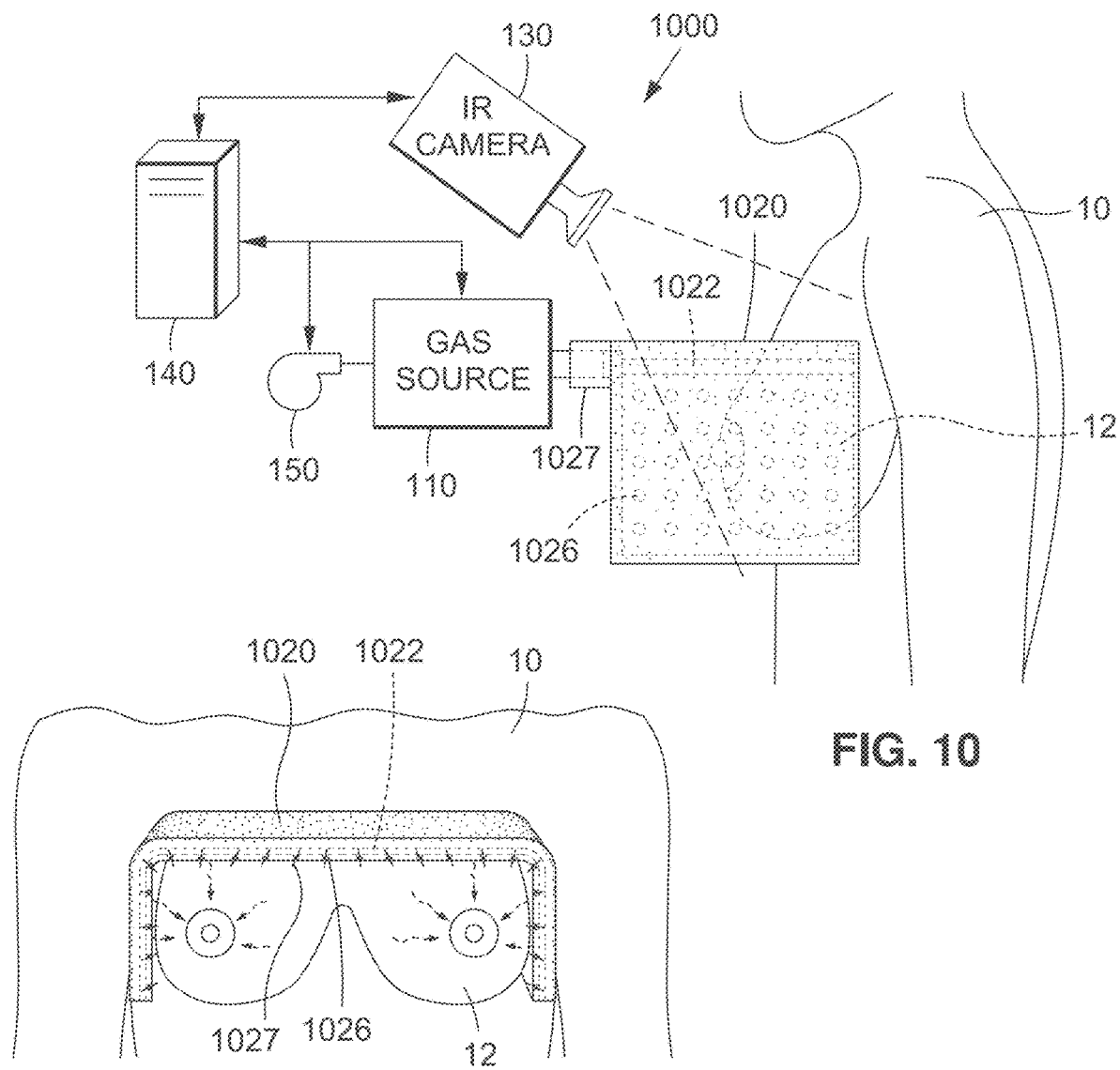
FIG. 10
FIG. 11
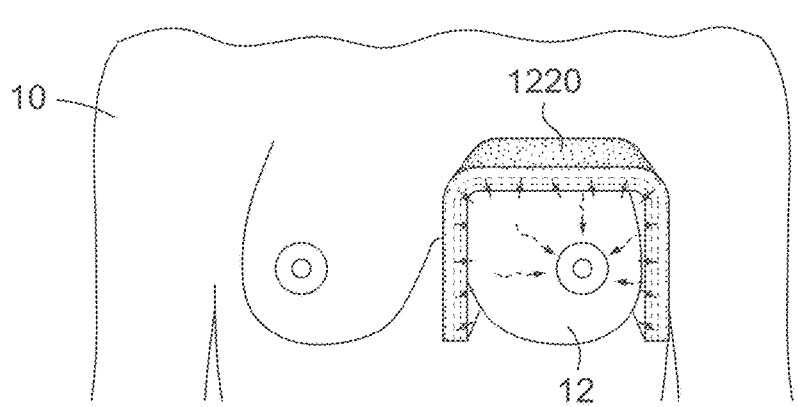
FIG. 12

INFRARED SIGNAL CAPTURE AND ANALYSIS

CROSS-REFERENCE TO RELATED APPLICATIONS

This application relates to and claims the benefit of U.S. Provisional Application No. 63/286,344, filed Dec. 6, 2021 and entitled "INFRARED SIGNAL CAPTURE AND ANALYSIS," the entire contents of which is expressly incorporated by reference.

STATEMENT RE: FEDERALLY SPONSORED RESEARCH/DEVELOPMENT

Not Applicable

BACKGROUND

1. Technical Field

The disclosed subject matter relates to the fields of bioscience and thermal analytics for scientific medical research and clinical application.

2. Related Art

Infrared (IR) thermal response to a sudden change in surface temperature is a documented and studied phenomenon in animate and inanimate surfaces. IR analysis is particularly suited for examination of an area of a human or non-human animal body exhibiting normal thermal emission or a deviation from that norm. Abnormal medical conditions do produce detectable thermal change from normal metabolic function in the life sciences and these changes are measurable as infrared emission. Thus, disorders of metabolic function can produce a change in thermal emission locally, regionally, or systemically. Examples include fever induced by an infectious agent (systemic), an organ or limb deprived of local blood supply (ischemia), or, in the obverse, a measurable increase in temperature from that of normal surrounding tissue, e.g., a boil of the skin or the development of a cancerous growth (e.g., malignant melanoma).

Each of these examples will exhibit either an elevated or decreased infrared emission compared to a normative value indicative of normal function. Whether IR emission is a static, increased, or decreased value has been and continues to be studied in all investigative fields of the life sciences including clinical and veterinary medicine. The measurement of temperature incorporating IR technology is a far more sensitive and accurate measurement of thermal emission than its predecessor, the mercury thermometer. And today the technology to measure metabolic activity using both quantitative and qualitative indices of IR emission for both human and veterinary subjects has been markedly improved.

Although IR analysis continues to be used by some veterinary and medical clinicians since the closing years of the 20th century for both research and clinical application, the means utilized to initiate a temperature "challenge" prompting a change in emissive thermal values from a surface under examination has been and is still administered in a loosely controlled manner. Examples of methods employed today include the use of ice, cold water, cold air, or mists that, when administered, provoke a thermal change to the surface under analysis. Unfortunately, scientific and medical research studies as well as clinical applications have been hampered by a lack of a standard and reliable method to repetitively evoke, capture, and analyze infrared data in response to a temperature challenge.

BRIEF SUMMARY

The present disclosure contemplates various systems, methods, and apparatuses for overcoming the drawbacks noted above that accompany the related art. One aspect of the embodiments of the present disclosure is a system for infrared analysis of a target surface region of a subject such as a patient's body. The system may comprise a reservoir containing a medium, such as a gas, at a predetermined temperature (e.g., less than 35° C. for a cold challenge) and a conduit defining a channel for transmitting the medium from the reservoir to the target surface region. The conduit may have a first end that is attached to an outlet of the reservoir and a second end that is flexibly conformable to a shape corresponding to a perimeter of the target surface region. The system may further comprise an infrared camera(s) operable to capture infrared image data of the target surface region and one or more processors operable to produce a representation of the captured infrared image data at a plurality of timings relative to the transmission of the medium from the reservoir to the target surface region.

The system may comprise a fan operable to drive the medium from the reservoir to the target surface region via the conduit.

The conduit may be infrared transparent.

The conduit may include one or more vents allowing the medium to pass from the channel to outside the conduit.

The system may comprise an adhesive provided on the second end of the conduit.

The conduit may comprise a detachable endpiece that has the second end.

The conduit may terminate in at least one flap by which the second end of the conduit is divided into two or more segments that are sealable together.

Another aspect of the embodiments of the present disclosure is a system for infrared analysis of a target surface region of a subject such as a patient's body. The system may comprise a reservoir containing a medium, such as a gas, at a predetermined temperature (e.g., less than 35° C. for a cold challenge) and a canopy that is deployable above and at least partially surrounding the target surface region. The canopy may have an inlet that is attached to an outlet of the reservoir and may have a plurality of outlets spaced apart from each other on an underside of the canopy. The canopy may define a plurality of channels for transmitting the medium from the reservoir to the target surface region via the inlet and the plurality of outlets. The system may further comprise an infrared camera(s) operable to capture infrared image data of the target surface region and one or more processors operable to produce a representation of the captured infrared image data at a plurality of timings relative to the transmission of the medium from the reservoir to the target surface region.

The system may comprise a fan or pump operable to drive the medium from the reservoir to the target surface region via the canopy.

The canopy may be infrared transparent.

The canopy may comprise a plurality of directable vents each of which is arranged to direct the medium exiting from a corresponding one of the plurality of outlets.

The canopy may comprise a top panel and two side panels. The two side panels may be hinged to the top panel at opposite sides thereof.

The canopy may comprise a flexible drape.

Another aspect of the embodiments of the present disclosure is a method of conducting infrared analysis of a target surface region of a subject such as a patient's body. The method may comprise providing a reservoir containing a medium at a predetermined temperature, transmitting the medium from the reservoir to the target surface region, and capturing infrared image data of the target surface region at a plurality of timings relative to the transmission of the medium from the reservoir to the target surface region. The plurality of timings may include a first timing during the transmission of the medium and a second timing during a recovery phase, the recovery phase being after cessation of the transmission but before the target surface region returns to a pre-transmission temperature. For example, a plurality of continuous timings may include a first timing (baseline) of the targeted surface prior to "challenge" administration (baseline resting state) and continue as a stream through IR changes effectuated by the temperature challenge induced by the delivered medium and continuing through and to recovery to resting baseline temperature after cessation of the challenge. The recovery phase may be defined as occurring after cessation of the "challenge" and recovery of the target surface region to pre-challenge resting temperature. The method may further comprise producing a representation of the captured infrared image data at the plurality of timings.

The target surface region may comprise both of the subject's breasts.

The target surface region may comprise only one of the subject's breasts.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 10 shows a system for infrared analysis having a canopy comprising a flexible drape, together with a subject undergoing the analysis viewed from the side;

FIG. 11 shows the canopy of FIG. 10, together with the subject viewed from the front; and FIG. 12 shows a canopy that surrounds only one of the subject's breasts, together with the subject viewed from the front.

DETAILED DESCRIPTION

The present disclosure encompasses various embodiments of systems, methods, and apparatuses for infrared analysis of a target surface region of a subject such as a patient's body. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
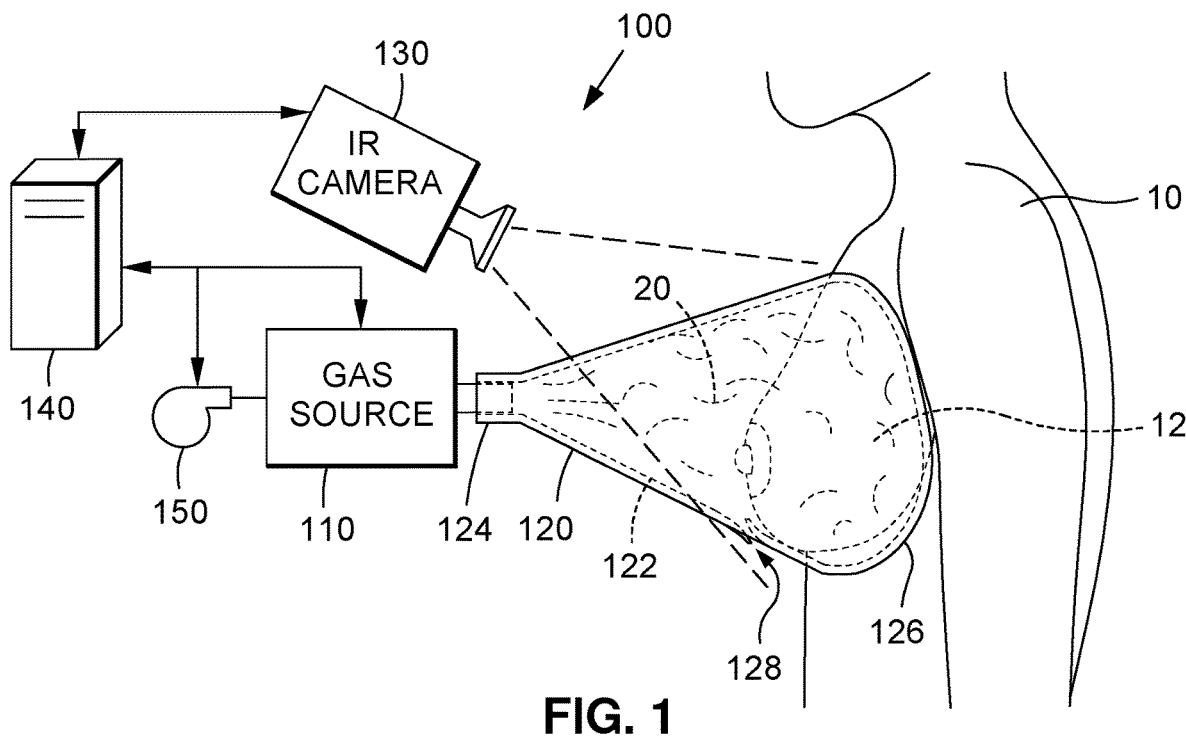
FIG. 1 shows a system for infrared analysis according to an embodiment of the present disclosure, together with a subject undergoing the analysis viewed from the side.

FIG. 1 shows a system 100 for infrared analysis of a target surface region 12 of a subject 10. The system 100 can be used for the detection of change in IR signal from that of the surrounding area under inspection. As an example, a subject 10 may be a patient's body (e.g., standing, sitting, or lying down) and the target surface region 12 may include one or both of the patient's breasts. Another example would be the examination of the blood supply to an area of an extremity. In general, the system 100 may deliver a temperature challenge to the target surface region 12 under controlled conditions, allowing for the capture of accurate IR features, both qualitative and quantitative. The system 100 may then analyze the IR features to produce an objective representation thereof for further evaluation by a human expert and/or a machine learning model. The system 100 may include a reservoir 110 such as a gas source, a conduit 120 for transmitting a gas or other medium 20 from the reservoir 110 to the target surface region 12, an IR camera(s) 130, and one or more processors 140.

The medium 20 may typically be a gas such as air, though a liquid or solid (e.g., a solid foam or solid particles transported by a fluid such as a solid composite mist) may also be used. Depending on the medium 20 used, the system 100 may include means for creating the medium 20 or pulling the medium 20 from the ambient environment. Unlike in the case of conventional cold challenges used today in breast thermography, the reservoir 110 may contain the medium 20 at a predetermined temperature (e.g., cold or warm) to allow for a replicable temperature challenge. For a cold challenge, the medium 20 may be kept at a predetermined temperature that is less than normal human body temperature for the target surface region 12, for example, less than 35° C. (e.g., 11° C.). In any case, the predetermined temperature may be able to evoke a measurable thermal response (physical or physiologic) from a surface, for example, cutaneous, mucosal (e.g., endoscopic application), pleural, parietal, peritoneal, exposed to a temperature gradient other than its normal resting temperature. As such, the predetermined temperature may be determined to be able to initiate a challenge for the surface under examination. The conduit 120 may define a channel 122 for transmitting the medium 20 from the reservoir 110 to the target surface region 12. At the same time, the conduit 120 may serve to isolate the target surface region 12 from extraneous environmental contamination and other factors, such as ambient temperature and humidity, that might otherwise affect the accurate and precise recording of IR data as may occur in conventional breast thermography.

Figure 2:
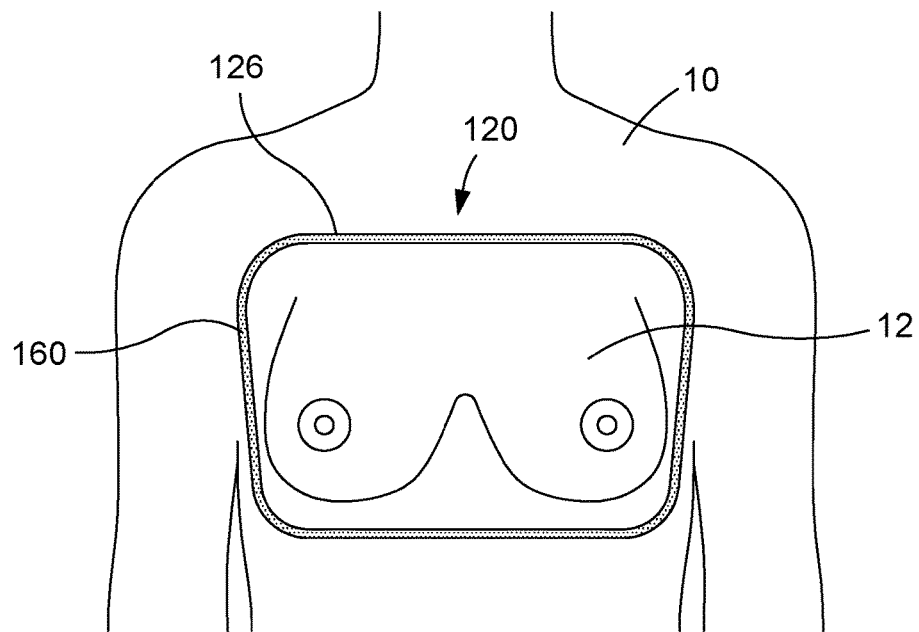
FIG. 2 shows a conduit of the system of FIG. 1, together with the subject viewed from the front.

FIG. 2 shows the conduit 120 together with the subject 10 viewed from the front. As depicted in the example of FIGS. 1 and 2, the conduit 120 may generally comprise a flexible appendage like a shroud or funnel that connects the reservoir 110 to the subject 10 and encloses the target surface region 12. In this regard, the conduit 120 may have a first end 124 (proximal end) that is attached to an outlet of the reservoir 110 and may be smaller and circular, for example, and a second end 126 (distal end) that is flexibly conformable to a shape corresponding to a perimeter of the target surface region 12. The target surface region 12 may, for example, be a rounded, trapezoidal or rectangular area of the subject's chest that surrounds and includes both breasts as shown in FIG. 2 (e.g., for a bilateral breast exam). As such, the second end 126 of the conduit 120 may be flexibly shaped to have (when in use) a superior edge that meets the chest wall above the breasts, an inferior edge that meets the chest wall below the breasts, and two lateral edges that connect the superior and inferior edges and meet the chest wall to the outer sides of the breasts, thus matching the perimeter of the target surface region 12 (though other geometrical shapes are contemplated as well including circular, oval, acute/obtuse angled, etc.).

An adhesive 160 may be provided on the second end 126 of the conduit 120 in order to adhere the conduit 120 to the subject 10 and create a seal between the conduit 120 and the subject 10 (e.g., between the conduit 120 and the patient's skin), thereby preventing the escape of the applied temperature gradient. The adhesive 160 may be an adhesive coating such as a non-toxic sealant that may bond all contact points of the second end 126 of the conduit 120 to the lateral chest wall, suprasternal area, and/or lower chest wall, for example. The second end 126 of the conduit 120 may be shaped to match the target surface region 12 and may then be adhered to the subject 10 so as to surround the target surface region 12, after which the medium 20 may be released from the reservoir 110 into the conduit 120. Owing to a secure seal created between the second end 126 of the conduit 120 and the subject 10, the conduit 120 may be insufflated by the medium 20, which will help to ensure an even distribution of the medium 20 over the entire target surface region 12 and thus an even application of the challenge temperature. In order to avoid overinflation of the conduit 120, and so that it is possible for the conduit 120 to remain at a steady state of inflation for a period of time, the conduit 120 may include one or more vents 128 allowing the medium 20 to pass from the channel 122 to outside the conduit 120. The vent(s) 128 may be simple openings or may be restrictor valves or one-way valves (e.g., flapper valves) that function as check valves to allow the medium 20 to escape without allowing ambient air to enter the conduit 120.

The IR camera (or cameras) 130 may be operable to capture IR image data of the target surface region 12 from any or all angles, e.g., face, anterior, posterior, lateral or medial. For example, the IR camera(s) 130 may be arranged outside the conduit 120 as shown in FIG. 1, aimed at the target surface region 12 through the intervening conduit 120. To this end, the conduit 120 may be infrared transparent (e.g., 93% or better IR transmissivity) to permit unimpeded reception of an IR signal by the IR camera(s) 130. For example, the conduit 120 may be fashioned from a material that is capable of containing and transmitting the medium 30 at temperature and is flexible, malleable, and transparent to visible light while providing no barrier to the transmission of IR emission to and/or from the target surface region 12 under examination. Example materials may include cellophane, polyethylene, or polypropylene. Alternatively, the conduit 120 may be opaque to visible light for patient privacy while still being IR transparent. It is also contemplated that the IR camera(s) 130 may be provided within the conduit 120 instead of outside of it, in which case the conduit 120 need not be IR transparent. The IR camera(s) 130 may be an electro-optical device used to capture IR images (progressively streamed or individually as discontinuous images) of the target surface region 12 without any direct physical contact with the subject 10. In some cases, one or more mirrors or other reflective surfaces may be placed in position to capture IR signals from any and all angled surfaces of the target surface region 12 (e.g., anterior, posterior, medial, lateral, oblique, circular), for example, for capturing the lateral aspect during a breast examination.

The one or more processors 140, which may be coupled to the IR camera(s) 130 as shown in FIG. 1, may be operable to produce a representation of the captured IR image data at a plurality of timings relative to the transmission of the medium 20 from the reservoir 110 to the target surface region 12. In general, all animate subjects undergoing a sudden increase or decrease in temperature to their external surface will respond through an autonomically controlled neural reflex. Animals with cutaneous surfaces or other outer coverings will respond to heat by sweating (dissipation of heat by the evaporative process) or, if exposed to cold, by a contraction of blood vessels beneath the skin surface to constrict the blood supply to the surface and conserve heat. In a similar fashion, inanimate surfaces will undergo an infrared emissive change when their exterior surfaces are subjected to a temperature challenge. Thus, IR analysis can be performed on any heat-containing body, be it an inanimate object (e.g., an environmental object such as the ocean or atmosphere or a functional object such as machinery or a pipeline) or an animate being in its broadest sense. A change in thermal emission, whether it is a positive or negative variance from a threshold temperature, may be measurable both qualitatively and quantitatively with IR scanning to serve as the basis for the clinical application of the IR analysis in clinical medicine. For example, the pattern of an IR signal produced before, during, and after a temperature challenge may be recorded, with IR camera technology permitting the capture of IR signal flux at each stage. Any change in IR emissivity during a normal resting state of a target, during the temperature challenge, and/or during the recovery (i.e., the return to the resting state) may be recorded.

The causative source of thermal dysfunction, as a means for identification of disease processes, may include inflammation and/or the proliferation of cells whether benign or malignant. Each of these processes require increased metabolic output producing a measurable heat differential different from that of normal tissue resulting in a measurable IR difference in IR emission. Additional examples of processes that are representative of physiologic disorder of metabolic function include inflammatory arthritis (increased metabolic) and ischemia of the limbs (decreased metabolic availability secondary to abnormalities of blood vessels). IR analysis may be employed as a diagnostic aid in diseases of the skin exhibiting either an increased or decreased thermal signal from the norm. Examples include melanoma, psoriatic arthritis and any conditions that are affected by decreased blood flow to an area producing atrophy or ulceration. Additionally, disorders of blood flow to a local or regional area of the body are measurable as change in IR indices.

With reference to the system 100, an induced temperature change of the target surface region 12 from a normal resting temperature through subsequent return to normal (or non-return to normal) will be captured by the IR camera(s) 130 and meaningfully represented by the one or more processors 140 enabling the qualitative and quantitative analysis of captured IR data. As an example (not to the exclusion of other examples), the IR camera(s) 130 may capture infrared image data of the target surface region 12 at a plurality of timings relative to the transmission of the medium 20 from the reservoir 110 to the target surface region 12. The plurality of timings may include a first timing during the transmission of the medium 20 and a second timing during a recovery phase that is after cessation of the transmission but before the target surface region 12 returns to a pre-transmission temperature (e.g., the resting state). For example, the plurality of timings may include timing corresponding to 1) the initial resting temperature of the surface 2) the change (IR variation) induced by the challenge to the targeted area during the transmission of the medium 20, 3) the recovery of IR emission levels upon cessation of the temperature challenge, and 4) return to resting IR temperature of the targeted surface. It is understood that the measurement of IR flux from basal temperature induced by the challenge to recovery of normal target temperature will be critically examined and analyzed throughout all phases of that recovery. The one or more processors 140 may produce a representation of the captured IR image data at the plurality of timings. Examples of human decipherable analyzable representations may include one or more graphs, charts, visual reproductions (including 2D or 3D visual representations generated from multiple IR cameras 120) or tables expressing the temperature or IR emission of the target surface region 12 as a function of time and/or analysis phase, with and without challenge temperature. The representation of the captured IR image may be visually interpretable by trained technicians and/or may comprise a feature set captured to a machine learning model where one or more features of the feature set is a function of the temperature or IR emission of the target surface region 12 with notations present and an associated time or analytic phase with or without challenge temperature administration. The representation produced by the one or more processors 140 and/or the underlying IR image data may be transmitted (e.g., electronic and/or web-based transmission) by the one or more processors 140 to one or more remote servers (e.g., a cloud) in a secured and encrypted format.

In operation, the transmission of the medium 20 from the reservoir 110 to the target surface region 12 via the conduit 120 may be initiated by operation of some mechanical, hydrostatic, or other artificial means for driving or impelling forward progress of the medium 20 so that it flows out of the reservoir 110 and through the conduit 120, e.g., by creating a gradient. In the illustrated example, the system 100 includes a fan 150 for this purpose, which may be operable to drive the medium 20 from the reservoir 110 to the target surface region 12 via the conduit 120. A pump or other means may be used instead of the fan 150, depending on the particular implementation considerations such as the nature of the medium 20. The operation of the fan 150 or other means may be accompanied by the opening of one or more valves associated with the outlet of the reservoir 110, all of which may be initiated in response to a predetermined signal for releasing the medium 20 to begin a transmission phase of the analysis. The output of any such initiation signal may be controlled by the one or more processors 140, for example, and may be based in part on feedback from the reservoir 110 (e.g., a temperature and/or pressure of the medium 20 within the reservoir 110), infrared data captured by the IR camera(s) 130 (e.g., pre-transmission IR data indicating that the target surface region 12 has reached an equilibrium condition after isolation from the external environment), etc., and/or in response to an instruction by a human operator. The one or more processors 140 may similarly control the predetermined temperature of the medium 30 in the reservoir 110 at all stages during the analysis.

In the above example, the second end 126 of the conduit 120 is flexibly shaped as desired to match the perimeter of the target surface region 12 under analysis. This is particularly useful given that slight anatomical differences between subjects 10 may make minor adjustments necessary, even when essentially the same target surface region 12 is under analysis on different subjects 10. By providing a malleable second end 126 of the conduit 120, the same conduit 120 may easily be adaptable to many different subjects 10 and different target surface regions 12, even considering the irregular surface of the subject 10 (such as the chest wall of a patient's body), which may not be perfectly flat. However, the disclosed subject matter is not limited to a conduit 120 that has a flexible second end 126. For example, it is also contemplated the second end 126 of the conduit 120 may not be flexible and may instead be rigidly formed into the above-described typical shape or other suitable shape at the time of manufacture (in which case different sizes and shapes may be available for different applications and/or for subjects 10 having different anatomies/geometries). In still other embodiments, the second end 126 of the conduit 120 may not only be flexible (allowing it to be reshaped) but also expandable/elastic so as to stretch to accommodate target surface regions 12 of different sizes. For example, the conduit 120 may be made of cellophane, which is both expandable and infrared transparent.

Figure 3:
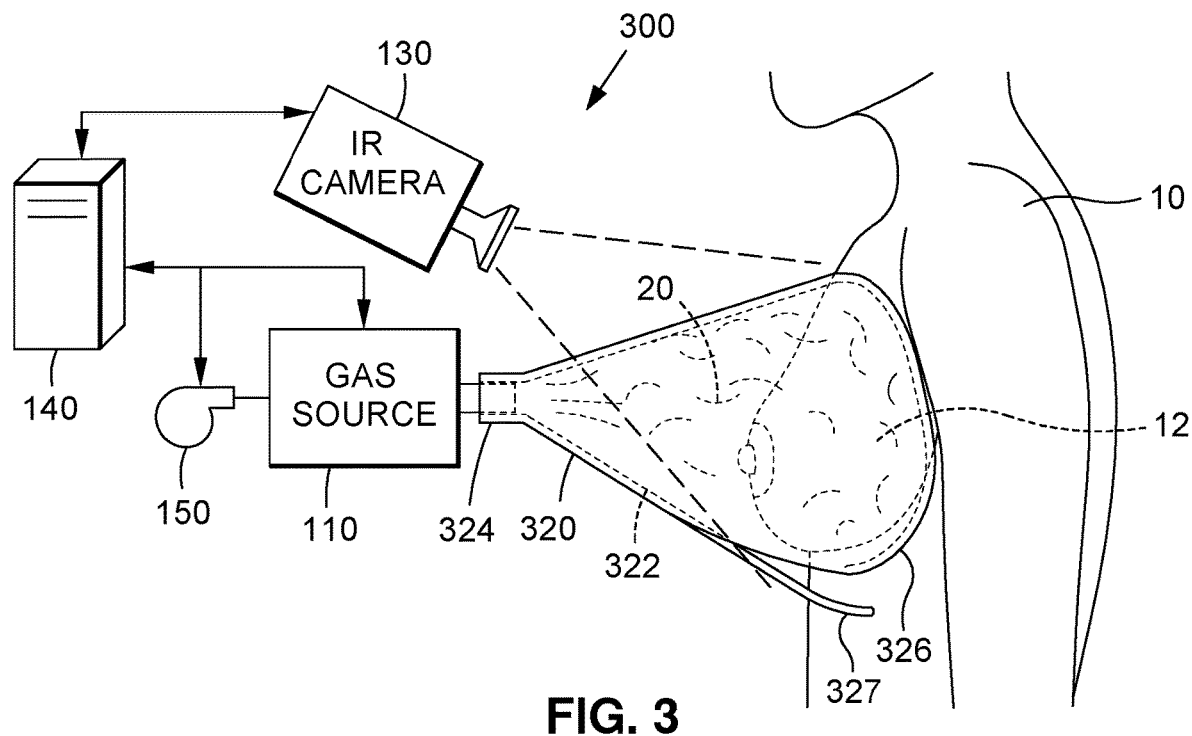
FIG. 3 shows a system for infrared analysis having a conduit with a flap on the bottom, together with the subject viewed from the side.
Figure 4:
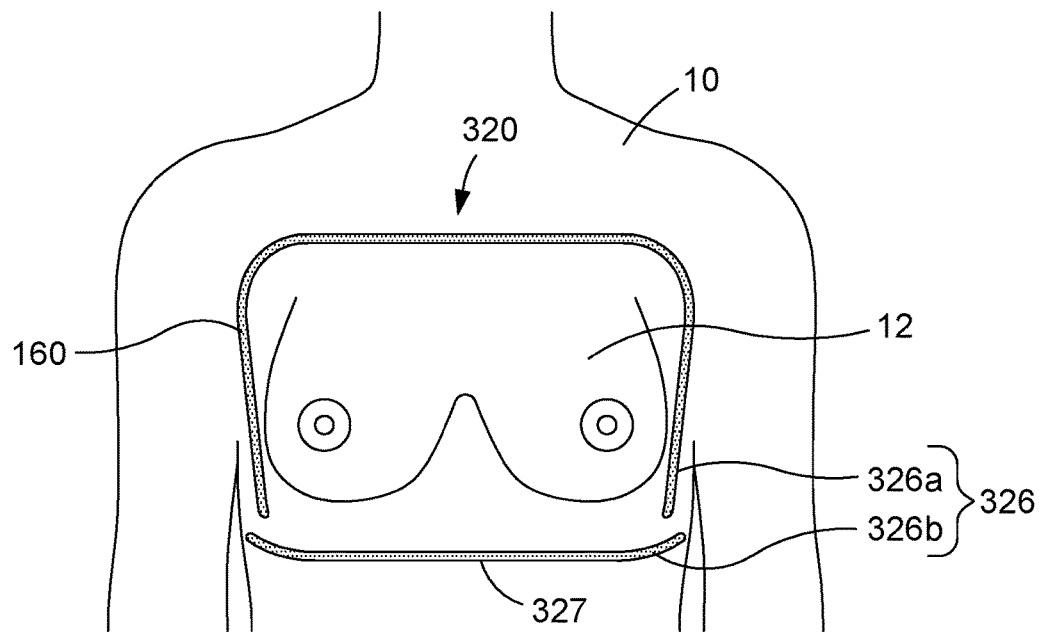
FIG. 4 shows the conduit of FIG. 3, together with the subject viewed from the front.

FIG. 3 shows a system 300 for infrared analysis of the target surface region 12 of the subject 10. FIG. 4 shows a conduit 320 of the system 300 together with the subject 10 viewed from the front. The system 300 may be largely the same as the system 100 and may have the reservoir 110, IR camera(s) 130, one or more processors 140, and fan 150, for example, but may have the conduit 320 in place of the conduit 120. The conduit 320 may define a channel 322 corresponding to the channel 122 of the conduit 120 and may have first and second ends 324, 326 corresponding to the first and second ends 124, 126 of the conduit 120. However, the conduit 320 may differ from the conduit 120 in that the conduit 320 terminates in at least one flap 327 by which the second end 326 of the conduit 320 is divided into two or more segments 326a, 326b that are sealable together (e.g., by adhesive). As shown in FIGS. 3 and 4, for example, the segment 326a may comprise the superior edge and lateral edges of the second end 326, while the segment 326b (defined by the end of the flap 327) may comprise the inferior edge of the second end 326. The ends of the lateral edges of the first segment 326a may be attached to the inferior second segment 326b defined by the end of the flap 327, thus sealing the gradient flow of the medium 20 within the conduit 320 to deliver the desired temperature challenge.

When the flap 327 is open, it may be easier to position the second end 326 of the conduit 320 to surround the target surface region 12, as the first segment 326a of the second end 326 can be placed over and around the breasts of the subject 10 rather than having to insert the breasts into the already-completed second end 326 of the conduit 320 that is bounded on all sides. The flap 327 can then be closed underneath the subject's breasts to seal the conduit 320. It is also contemplated that the second segment 326b defined by the flap 327 may in some cases be sealable to the first segment 326a in different positions to selectively increase or decrease the size of the resulting second end 326 depending on the target surface region 12 and the subject's anatomy.

Figure 5:
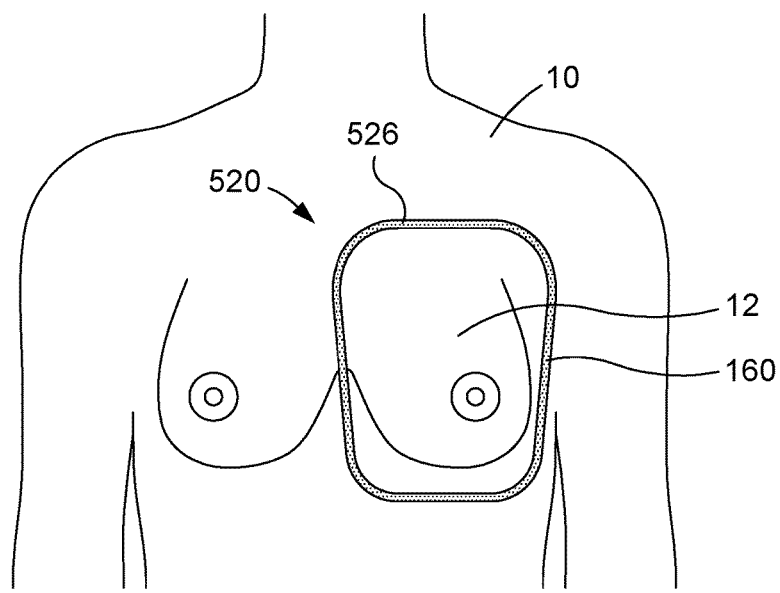
FIG. 5 shows a conduit that surrounds only one of the subject's breasts, together with the subject viewed from the front.

FIG. 5 shows an alternative conduit 520 that may be used in place of the conduit 120 of FIGS. 1 and 2 or the conduit 320 of FIGS. 4 and 5, together with the subject 10 viewed from the front. While not separately illustrated, it is to be understood that the conduit 520 may terminate in one or more flaps like the flap 327 of FIG. 4. In this regard, FIG. 5 may be regarded either as depicting no such flap or depicting a flap that is closed (such that two or more segments of the second end 526 of the conduit 520 are sealed together). In either case, the difference between the conduit 520 and the above-described conduits 120, 320 is in the size of the distal end 526 thereof. Like the distal end 126 shown in FIG. 2 and the distal end 326 shown in FIG. 4, the distal end 526 may be flexibly conformable to a shape corresponding to a perimeter of the target surface region 12. However, in the case of FIG. 5, the target surface region 12 may surround only one of the subject's breasts. A such, the second end 526 of the conduit 520 may be flexibly shaped (when in use) to have a superior edge that meets the chest wall above the one breast, an inferior edge that meets the chest wall below the one breast, a lateral edge that connects the superior and inferior edges and meets the chest wall to the outer side of the one breast, and a medial edge that connects the superior and inferior edges on the other side and meets the chest wall to the inner side of the one breast, thus matching the perimeter of the target surface region 12. Such a conduit 520 may be used for better isolation from the ambient environment in the case of IR analysis of only a single breast (or of a smaller target surface region 12 in general). It is also contemplated that, depending on whether the distal end 526 of the conduit 520 is expandable/elastic, the same conduit 520 may in some cases be usable for either a single breast or both breasts, with the distal end 526 being stretched to accommodate a wide range of target surface regions 12. As in the case of the conduits 120, 320, an adhesive 160 may be provided on the second end 526 of the conduit 520 in order to adhere the conduit 520 to the subject 10 and create a seal therebetween.

As noted above, the second end 126, 326, 526 of the conduit 120, 320, 520 may be rigidly (rather than flexibly) formed. In such case, the conduit 120, 320, 520 or second end 126, 326, 526 thereof may take the form of an IR transparent or translucent cupola or dome that is molded to conform to the surface under examination and may come in various sizes (e.g., small, medium, large, extra-large) and/or shapes (e.g., single breast or bilateral structure) to meet the needs of the particular target surface region 12 under examination. It should be noted that the same FIGS. 1-5 may represent the rigid structure rather than the flexible structure, with the same features described in relation to these drawings (e.g., vent 128, 160, flap 327, etc.) being applicable to both. Such a rigid conduit 120, 520, 520 may be light weight, may be single use or multiple use, and, advantageously, may be easily cleansed between examinations. It is also contemplated that the adhesive 160 may be replaced with a non-adhesive contact surface that may be made of a compressible material such as foam rubber or a gelatinous malleable material for a comfortable, conforming, and/or sealing fit against the patient's body or other subject 10.

Figure 6:
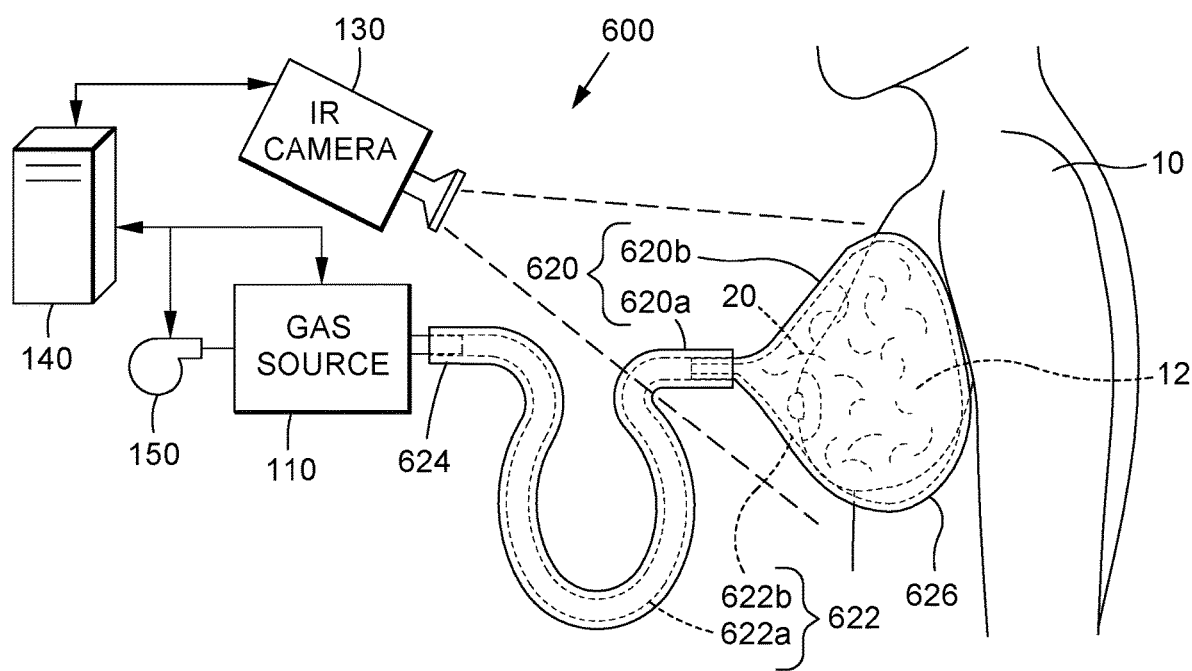
FIG. 6 shows a system for infrared analysis having a conduit with a detachable endpiece, together with the subject viewed from the side.

FIG. 6 shows a system 600 for infrared analysis of the target surface region 12 of the subject 10. The system 600 may be largely the same as the system 100, 300 and may have the reservoir 110, IR camera(s) 130, one or more processors 140, and fan 150, for example, but may have the conduit 620 in place of the conduit 120, 320, 520. The conduit 620 may define a channel 622 corresponding to the channel 122, 322 and may have a first end 624 and a second end 626 corresponding to the first end 124, 324 and second end 126, 326, 526 described above. However, the conduit 620 may differ from the conduit 120, 320, 520 in that the conduit 620 may comprise a detachable endpiece 620b that has the second end 626. In this regard, the conduit 620 may be divided into a tube portion 620a and the detachable endpiece 620b, with the internal channel 622 likewise being divided into a tube portion channel 622a and an endpiece channel 622b, respectively. The two parts 620a, 620b of the conduit 620 may be detachably attached to each other by a friction fit or by a sealable connector such as a quick connect or a threaded plastic connector with a rubber gasket. (It is noted that the same or different attachment means can be used to connect the first end 124, 324, 624 to the reservoir 110.) The detachable endpiece 620b may be swappable to allow for different sizes or types, such as an endpiece 620b sized for both breasts (see conduit 160 of FIG. 2), sized for one breast (see conduit 560 of FIG. 5), sized for different subjects 10 with larger or smaller bodies, having a more or less flexible and/or a more or less expandable/elastic second end 626, including or not including a flap 327 (see conduit 320 of FIG. 4), etc. The detachable endpiece 620b may also be single-use and disposable for hygienic reasons, with the tube portion 620a being reusable from subject to subject. The tube portion 620a may serve as an extension to allow the subject 10 to be positioned at a comfortable distance from the reservoir 110 and may generally be longer than the disposable endpiece 620b.

Figure 7:
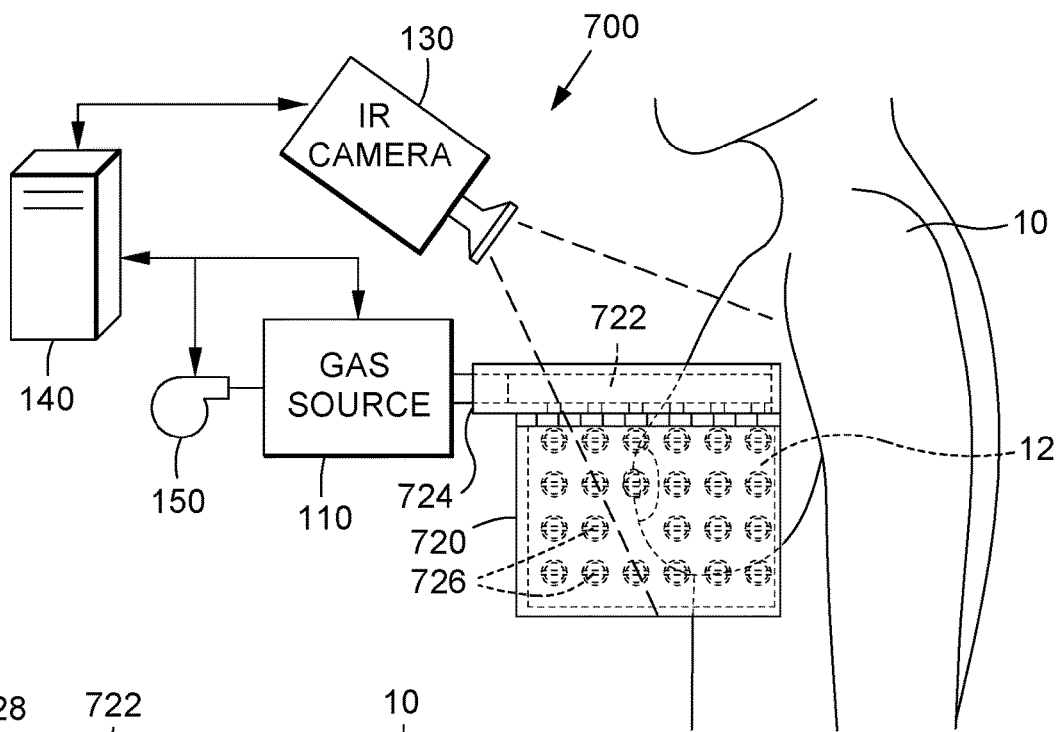
FIG. 7 shows a system for infrared analysis having a canopy, together with a subject undergoing the analysis viewed from the side.
Figures 8, 8A:
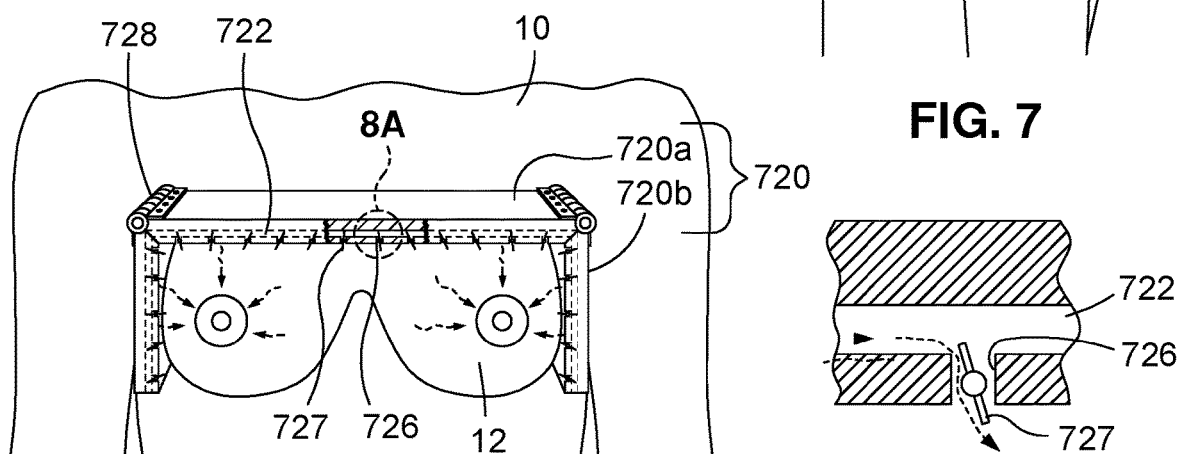
FIG. 8 shows the canopy of FIG. 7, together with the subject viewed from the front.
FIG. 8A shows a closeup view of an outlet of the canopy.

FIG. 7 shows a system 700 for infrared analysis of the target surface region 12 of the subject 10. FIG. 8 shows a canopy 720 of the system 700 together with the subject 10 viewed from the front. The system 700 may be largely the same as the system 100, 300, 600 and may have the reservoir 110, IR camera(s) 130, one or more processors 140, and fan 150, for example, but may have a canopy 720 in place of the conduit 120, 320, 520, 620. The canopy 720 may have an inlet 724 that is attached/affixed to an outlet of the reservoir 110 (e.g., by the same means described above with respect to the first end 124, 324, 624) and a plurality of outlets 726 that are spaced apart from each other on an underside of the canopy 720. A plurality of channels 722 may be defined by the canopy 720 for transmitting the medium 20 from the reservoir 110 to the target surface region 12 via the inlet 724 and the plurality of outlets 726. In the above-described examples, the conduit 120, 320, 520, 620 may be thought of as functioning as a tube that surrounds, envelops, or encases the target surface region 12 of the subject 10, such that the channel 122, 322, 522, 622 for the medium 20 terminates at the target surface region 12 (e.g., with one or both of the subject's breasts being within the channel 122, 322, 522, 622). In contrast, the plurality of channels 722 defined by the canopy 720 may terminate in the plurality of outlets 726 that are spaced from the target surface region 12 and serve to direct the medium 20 from the canopy 720 toward the target surface region 12. In this regard, the canopy 720 may be seen as a less obtrusive option as compared to the conduit 120, 320, 520, 620, one that is deployable above and at least partially surrounding the target surface region 12 but need not interface so directly with the subject 10 (and in some cases need not even touch the subject 10). It is noted that the canopy 720 may connect directly to the reservoir 110 or may be provided as a detachable endpiece 620b of the conduit 620 described above. In some use cases, for example, the canopy 720 may have a solid or semi-solid construction (e.g., made of a lightweight, porous material) and may serve as a non-disposable, reusable endpiece 620b, whereas the conduit-type endpieces 620b described above may serve as disposable and replaceable options.

As best seen in FIG. 8, the canopy 720 may comprise a top panel 720a and two side panels 720b with the two side panels 720b being hinged to the top panel 720a at opposite sides thereof. For example, as illustrated, the top panel 720a may be positioned above the target surface region 12 (e.g., above the subject's breasts) and the side panels 720b may extend perpendicularly down from the top panel 720 on opposite lateral sides of the target surface region 12 (e.g., to the left of the subject's left breast and to the right of the subject's right breast), such that the canopy 720 encompasses the target surface region 12. To this end, the canopy 720 may include hinges 728 between the top panel 720a and the side panels 720b (see FIG. 8). The hinges 728 may allow the canopy 720 to accommodate a variety of subjects 10 and target surface regions 12, as the side panels 720b may be spread farther apart or brought closer together as needed. The hinges 728 may also allow the side panels 720b to be positioned coplanar with the top panel 720a such that the canopy 720 may thus lie flat when not in use. The outlets 726 may be provided on the underside of the top panel 720a as well as on the interior sides of the side panels 720b. The channels 722 may be embedded in the canopy 720 and may extend throughout the canopy 720, branching to extend in both the top panel 720a and the side panels 720b so that the medium 20 can reach all of the outlets 726. The number and diameter of the channels 722 may be selected to deliver an unimpeded flow from the outlets 726. The part of the top panel 720a and side panels 720b that contacts or comes near the subject 10 may be contoured in accordance with the subject's anatomy to allow close skin proximity (and in some cases an adhesive may be used for secure attachment to the subject 10).

As shown in the closeup view of FIG. 8A, each of the outlets 726 may be provided with an external directable vent 727 like the vents in an automobile air conditioning system. The directable vents 727 may be a fixed or attachable accoutrement to the canopy 720. Each of the directable vents 727 may be arranged to direct the medium 20 exiting from a corresponding one of the plurality of outlets 726. The directable vents 727 may be used to direct the medium 20 toward the target surface region 12 (e.g., at each breast) to focus the desired thermal temperature flow for a more accurate and efficient temperature challenge that takes into account the particular size and shape of the subject 10.

Figure 9:
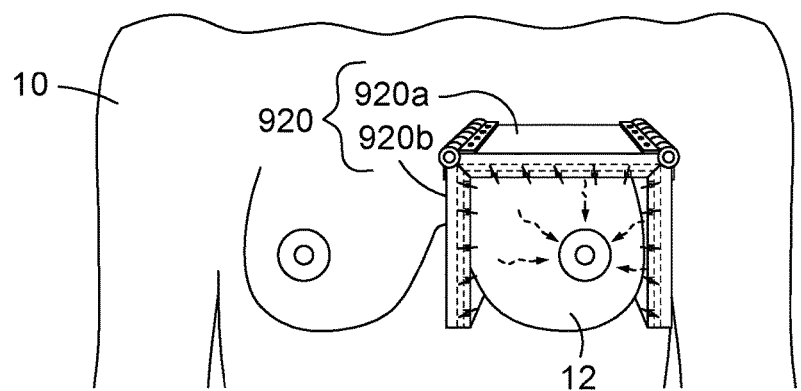
FIG. 9 shows a canopy that surrounds only one of the subject's breasts, together with the subject viewed from the front.

FIG. 9 shows an alternative canopy 920 that may be used in place of the canopy 720 of FIGS. 7 and 8, together with the subject 10 viewed from the front. The difference between the canopy 920 and the above-described canopy 720 is in its size, and particularly in the size of the top panel 920a thereof, and the two side panels 920b thereof, which may be suitable for a single one of the subject's breasts rather than both breasts. Such a canopy 920 may be used for better isolation from the ambient environment in the case of IR analysis of only a single breast (or of a smaller target surface region 12 in general). Like the canopy 720, the canopy 920 may connect directly to the reservoir 110 or may be provided as a detachable endpiece 620b of the conduit 620 described above.

FIG. 10 shows a system 1000 for infrared analysis of the target surface region 12 of the subject 10. FIG. 11 shows a canopy 1020 of the system 1000 together with the subject 10 viewed from the front. The system 1000 may be largely the same as the system 700 and may have the reservoir 110, IR camera(s) 130, one or more processors 140, and fan 150, for example, but may have the canopy 1020 in place of the canopy 720, 920. Like the inlet(s) 724 and outlets 726 of the canopy 720, 920, the canopy 1020 may have an inlet 1024 that is attached to an outlet of the reservoir 110 and a plurality of outlets 1026 that are spaced apart from each other on an underside of the canopy 1020. Like the outlets 726 that are provided with an external directable vent 727, the outlets 1026 may be provided with a directable vent 1027 that are arranged to direct the medium 20 exiting from a corresponding one of the plurality of outlets 1026. The directable vents 1027 are understood to have the same uses as the directable vents 727 as explained above. The canopy 1020 may further define a plurality of channels 1022 for transmitting the medium 20 from the reservoir 110 to the target surface region 12 via the inlet 1024 and the plurality of outlets 1026. However, the canopy 1020 may differ from the canopy 720, 920 in that the canopy 1020 may comprise a flexible drape in addition to or instead of the panel(s) 720a, 720b. In the illustrated example, a single flexible drape serves as the entire canopy 1020. As another example, there may be a top panel 720a with flexible drapes hung on opposite sides instead of the hinged side panels 720b.

FIG. 12 shows an alternative canopy 1220 that may be used in place of the canopy 1020 of FIGS. 10 and 11, together with the subject 10 viewed from the front. The difference between the canopy 1220 and the above-described canopy 1020 is in its size, which may be suitable for a single one of the subject's breasts rather than both breasts. Such a canopy 1220 may be used for better isolation from the ambient environment in the case of IR analysis of only a single breast (or of a smaller target surface region 12 in general). Like the canopies 720, 920, the canopies 1020, 1220 may connect directly to the reservoir 110 or may be provided as a detachable endpiece 620b of the conduit 620 described above.

Like the conduit 120, 320, 520, 620, the canopy 720, 920, 1020, 1220 may be infrared transparent to allow the IR camera(s) 130 to capture IR data from the target surface region 12 through the canopy 720, 920, 1020, 1220. Alternatively, since the canopy 720, 920, 1020, 1220 may generally be open on bottom, the IR camera(s) 130 may be positioned underneath the canopy 720, 920, 1020, 1220 and may capture IR data from the target surface region 12 without any portion of the canopy 720, 920, 1020, 1220 being in the way. In this case, the canopy 720, 920, 1020, 1220 may be opaque to IR, allowing for the use of a greater variety of materials for its construction.

All objects, animate and inanimate, have thermal energy content. That thermal energy is transmitted via conduction, convection and radiation in the form of infrared emission. Invisible to the human eye, infrared energy is a component of the electromagnetic energy spectrum in the 3-15 μm wavelength that can be used both qualitatively and quantitatively to evaluate thermal energy content of an object as adjusted to/with an emissivity coefficient. The evaluation and/or analysis of infrared radiation has many practical applications that include scientific, engineering, industrial, military and medical applications. Inherent inefficiencies of animate metabolism produce thermal energy that eventually must be transmitted to the surrounding environment. A high-resolution infrared imaging device is an effective means by which to capture and evaluate levels and perturbations of metabolic processes. Embodiments of the present disclosure are designed to provide both a device and method for the evaluation and primary evaluation of infrared image data of objects of interest.

Owing in part to the above-described conduit 120, 320, 520, 620 and/or canopy 720, 920, 1020, 1220, the disclosed system 100, 300, 600, 700, 1000 will provide for the delivery of a focused precision temperature challenge isolated from external factors and controlled within known and discoverable error ranges. As a result, IR data of a resting target surface region 12 may be captured and/or monitored (surveillance via IR camera(s) 130 to precisely capture the maximum response to a challenge) enabling IR analysis in a scientific, reliable and reproducible manner. The system 100, 300, 600, 700, 1000 can be configured as a portable/transportable system, a stationary system, and/or a mobile system and can be used for research, clinical, or industrial applications.

In short, unlike conventional methods of infrared analysis that have not achieved scientific acceptance due to deficiencies in either signal production, capture and/or analysis, this device and accompanying analytic application will. It will provide data 1) that accurately records infrared features, both qualitative and quantitative, of an area of interest throughout a programmed span of data capture, 2) that is replicable by negating environmental thermal vagaries, 3) that will produce objective IR data enabling animate scientific and medical research, 4) that is secure and confidential by encryption of infrared image data equal to or greater than HIPAA requirements, and 5) that is transmissible to one or more remote servers (e.g., a cloud) for various purposes including HIPAA-compliant joint sharing. The disclosed devices and methods can provide a continuous and/or intermittent recorded stream of infrared signals (thermal measurement) from any animate or inanimate object exposed to a non-resting temperature (a thermal differential "challenge"), which may be any event capable of eliciting a thermal response differing from that of a subject's resting temperature. The capture of thermal data may include a resting value, the response to a temperature challenge, and conclude with a return to resting temperature (recovery). The disclosed subject matter may enable both qualitative and quantitative evaluation of the infrared image data that can include a computational evaluation of the dynamic properties of the target surface region 12 preceding, during, and following the challenge. The data captured can be interpreted graphically, as an image or as a written evaluation.

Conventional means used to induce an IR thermal response are varied and the temperatures used to provoke a thermal challenge are not reliably measured or standardized prior to and during the administration of the examination. Thus, the predictability, accuracy, and reliability of collected data from conventional IR analysis is compromised and not suitable for scientific analysis. If the scientific indicia of analysis are not met, the development of IR analysis in both scientific and clinical applicative areas will continue to be unrealized. The device and methods of IR analysis disclosed in this document will provide accurate verifiable IR emissive data from any surface. The initial acquired IR data on a surface will be scientifically reproducible on reexamination. The IR emissive "challenge" may be tempered to the analytic requirements of any subject containing heat (e.g., a black body). The presented iteration described above may be designed for use on both human and veterinary subjects 10. The data is scientifically verifiable as a means to precisely deliver a predetermined challenge temperature to a surface under analysis while remaining unencumbered by any surrounding environmental restrictions. The tempered fabricated challenge is accurately conveyed to a targeted surface. The acquisition of data is provided by radiometric infrared technology and the captured thermal data may be transmitted for analysis and can be analyzed by professional/trained personnel or by any approved means including artificial intelligence or systems availing the use of other means (human/mechanical/electronic/web/cloud-based). Data analysis can be performed in any means able to be captured.

The functionality described above in relation to the one or more processors 140 may be wholly or partly embodied in one or more computers including a processor (e.g., a CPU), a system memory (e.g., RAM), and a hard drive or other secondary storage device. The processor may execute one or more computer programs, which may be tangibly embodied along with an operating system in a computer-readable medium, e.g., the secondary storage device. The operating system and computer programs may be loaded from the secondary storage device into the system memory to be executed by the processor. The computer may further include a network interface for network communication between the computer and external devices (e.g., over the Internet), such as with one or more remote computers that may perform some or all of the analysis (e.g., a cloud-based machine learning service).

The above computer programs may comprise program instructions which, when executed by the processor, cause the processor to perform operations in accordance with the various embodiments of the present disclosure. The computer programs may be provided to the secondary storage by or otherwise reside on an external computer-readable medium such as a solid-state semiconductor memory drive (e.g., SSD), a rotating magnetic recording medium drive (e.g., hard drive), an optical recording medium such as a CD, DVD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate array (FPGA) or programmable logic array (PLA).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for infrared analysis of a target surface region of a subject, the system comprising:
   a reservoir containing a medium at a predetermined temperature;
   a conduit defining a channel for transmitting the medium from the reservoir to the target surface region, the conduit having a first end that is attached to an outlet of the reservoir and a second end that is flexibly conformable to a shape corresponding to a perimeter of the target surface region and defining a sealed microenvironment test space with a pressure relief vent, the sealed microenvironment test space surrounding the target surface region of the subject and having a predefined volume and a predefined atmospheric condition therein based upon an evacuation of an ambient environment and replacement with the medium;
   an infrared camera operable to capture infrared image data of the target surface region through the sealed microenvironment test space; and
   one or more processors operable to produce a representation of the captured infrared image data at a plurality of timings relative to the transmission of the medium from the reservoir to the target surface region.

2. The system of claim 1, wherein the medium is a gas.

3. The system of claim 1, further comprising a fan operable to drive the medium from the reservoir to the target surface region via the conduit.

4. The system of claim 1, wherein the predetermined temperature is less than 35° C.

5. The system of claim 1, wherein the conduit is infrared transparent.

6. The system of claim 1, wherein the conduit includes one or more vents allowing the medium to pass from the channel to outside the conduit.

7. The system of claim 1, further comprising an adhesive provided on the second end of the conduit.

8. The system of claim 1, wherein the conduit comprises a detachable endpiece that has the second end.

9. The system of claim 1, wherein the conduit terminates in at least one flap by which the second end of the conduit is divided into two or more segments that are sealable together.

10. A system for infrared analysis of a target surface region of a subject, the system comprising:
    a reservoir containing a medium at a predetermined temperature;
    a canopy that is deployable above and at least partially surrounding the target surface region, the canopy having an inlet that is attached to an outlet of the reservoir and having a plurality of outlets spaced apart from each other on an underside of the canopy, the canopy defining a plurality of channels for transmitting the medium from the reservoir to the target surface region via the inlet and the plurality of outlets, the canopy further defining a sealed microenvironment test space with a pressure relief vent, the sealed microenvironment test space surrounding the target surface region of the subject and having a predefined volume and a predefined atmospheric condition therein based upon an evacuation of an ambient environment and replacement with the medium;
    an infrared camera operable to capture infrared image data of the target surface region through the sealed microenvironment test space; and
    one or more processors operable to produce a representation of the captured infrared image data at a plurality of timings relative to the transmission of the medium from the reservoir to the target surface region.

11. The system of claim 10, wherein the medium is a gas.

12. The system of claim 10, further comprising a fan operable to drive the medium from the reservoir to the target surface region via the canopy.

13. The system of claim 10, wherein the predetermined temperature is less than 35° C.

14. The system of claim 10, wherein the canopy is infrared transparent.

15. The system of claim 10, wherein the canopy comprises a plurality of directable vents each of which is arranged to direct the medium exiting from a corresponding one of the plurality of outlets.

16. The system of claim 10, wherein the canopy comprises a top panel and two side panels, the two side panels hinged to the top panel at opposite sides thereof.

17. The system of claim 10, wherein the canopy comprises a flexible drape.

18. A method of conducting infrared analysis of a target surface region of a subject, the method comprising:
    providing a reservoir containing a medium at a predetermined temperature;
    transmitting the medium from the reservoir to the target surface region, the target surface region being enclosed within a sealed microenvironment test space with a pressure relief vent, the sealed microenvironment test space having a predefined volume and a predefined atmospheric condition therein based upon an evacuation of an ambient environment and replacement with the medium;
    capturing infrared image data of the target surface region through the sealed microenvironment test space at a plurality of timings relative to the transmission of the medium from the reservoir to the target surface region, the plurality of timings including at least a first timing during the transmission of the medium and a second timing during a recovery phase, the recovery phase being after cessation of the transmission of the medium but before the target surface region returns to a pre-transmission temperature; and
    producing a representation of the captured infrared image data at the plurality of timings.

19. The method of claim 18, wherein the target surface region comprises both of the subject's breasts.

20. The method of claim 18, wherein the target surface region comprises only one of the subject's breasts.

* * * * *